United States Patent [19]

Sigalov

[11] Patent Number: 5,017,770

[45] Date of Patent: May 21, 1991

[54] TRANSMISSIVE AND REFLECTIVE OPTICAL CONTROL OF SOUND, LIGHT AND MOTION

[76] Inventor: Hagai Sigalov, 20 Eastside Rd., N.W. 11, London, England

[21] Appl. No.: 388,386

[22] Filed: Aug. 2, 1989

Related U.S. Application Data

[62] Division of Ser. No. 81,007, Jun. 1, 1987, abandoned.

[51] Int. Cl.[5] .................... G01V 9/04

[52] U.S. Cl. .................... 250/221; 84/639

[58] Field of Search .................... 250/221, 222.1; 340/555, 556, 557; 84/1.18

[56] References Cited

U.S. PATENT DOCUMENTS 4,841,283 6/1989 Bubliewicz .................... 340/545

FOREIGN PATENT DOCUMENTS

WO 84/04986 12/1984 PCT Int'l Appl. .

*Primary Examiner*—David C. Nelms

*Attorney, Agent, or Firm*—Price, Heneveld, Cooper, DeWitt & Litton

[57] ABSTRACT

A source of multiple beams of light is arrayed with a plurality of optical transmission and reflection mirrors to provide control of light, sound and motion. The light source can be portable and opened like an umbrella to position the multiple beams of light above a stage. An entertainer, for example a dancer, can move among the beams of light and sensors to produce a desired effect.

25 Claims, 12 Drawing Sheets

TRANSMISSIVE AND REFLECTIVE OPTICAL CONTROL OF SOUND, LIGHT AND MOTION

This is a divisional of co-pending application Ser. No. 081,007 filed on Jun. 1, 1987, now abandoned.

FIELD OF THE INVENTION

This invention relates to producing control signals. It has particular application to control signals for producing and/or controlling music, particularly synthetic (electronic) music but can be applied to other purposes requiring a wide range of control actions such as are entailed in e.g. playing music.

The present application claims priority from British patent application No. 8524708 lodged on 7 Oct. 1985 and from British patent application No. 8608067 lodged on 2 Apr. 1986 and includes the subject of those applications and developments thereof. Accordingly, the present specification is divided hereafter into three parts, the first being a reproduction of the specification of application 8524708 (hereinafter called "my prior specification"), the second part being a reproduction of the extra parts of the specification of application 8608067 (hereinafter called "my second specification"), commencing with a summary of my prior specification and going on to give details and developments thereof, the third part being entitled "my third specification", giving details and developments of the matter contained in my prior specification and my second specification.

FIGS. 1 to 6B of the accompanying drawings are those of my prior specification, while FIGS. 7 to 10 are those relating to my second specification, and FIGS. 12 to 20 relate to my third specification.

MY PRIOR SPECIFICATION

Optimusic

Light Activated Interface for Triggering Electronic Musical Instruments

Technical Field

This invention relates to using all kinds of lights, including laser, to trigger electronic musical instruments.

Background

Electronic musical instruments are used extensively in modern music creation. These machines are operated by mechanical means, using switches and electromechanical controls to create sound and to reproduce digitally recorded sounds. These machines however, are limited by the fact that the user has to be in "physical contact" with the controls in order to operate them.

Essential Technical Features

This invention uses light sensors connected to electronics which interface to operate existing electronic musical instruments. To play this instrument, the musician can either:

FOR TYPE A : interrupt a dedicated light beam which falls on to a light sensor

FOR TYPE B: cause a light beam from any movable light source to fall on to a light sensor.

EXAMPLES

Suggested designs of different sections of the invention will now be described by way of example, with reference to drawings in which:

FIG. 1 shows for TYPE A how a single sensor element is activated

FIG. 1*a* shows the diagram of circuitry used for TYPE A

FIG. 2 shows for TYPE B how a single light sensing element is activated

FIG. 2*a* shows the diagram of circuitry used for TYPE B

FIGS. 3*a*, 3*b*, 3*c* illustrate different arrangements of the elements shown in FIGS. 1, 1*a* and FIGS. 2, 2*a*.

FIGS. 4*a*, 4*b*, 4*c* show different configurations of elements shown in FIGS. 1, 1*a* and FIGS. 2, 2*a*.

FIGS. 5*a*, 5*b* show the construction and circuit block diagram of two light sensing elements featuring velocity sensitive dynamics.

FIGS. 6*a*, 6*b* show the construction and circuit block diagram of four light sensing elements facilitating sequentially sensitive dynamics.

EXAMPLE TEXT FOR TYPE A

Figure 1:
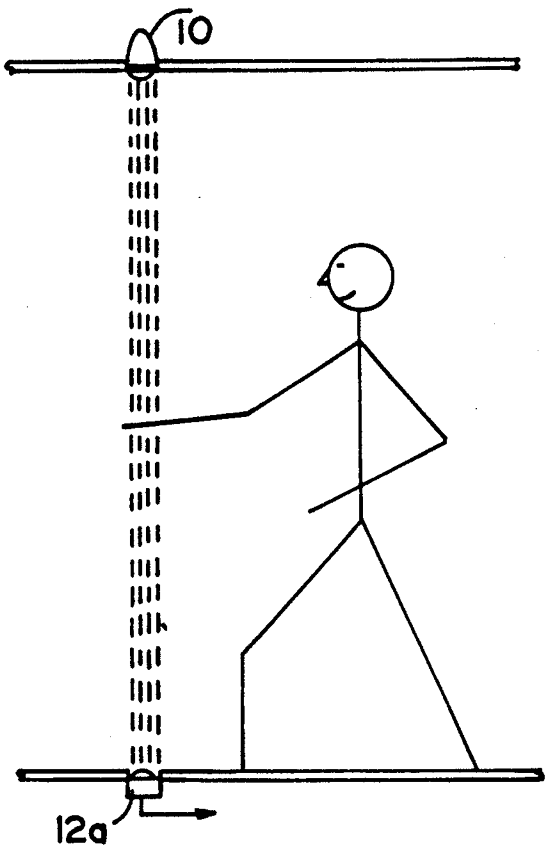

FIG. 1 shows that a dedicated, directional light source (10) similar to a pin spot, is mounted approximately 3 m above the floor, in a specially constructed ceiling. During operation, this light source will be switched on and cast a beam of light downwards, directed onto a "light sensing element" (L.S.E.) (12*a*), mounted on a specially constructed floor. By interrupting this light beam, the operator stops the light from falling on to the sensor. This sensor then triggers the electronics shown in FIG. 1*a*. A lens is used to concentrate the light onto the sensor and this sensor is connected to a pulse generator. The pulse generator creates a 5 v 1 ms pulse (16) every time the light is stopped from falling onto the sensor.

EXAMPLE TEXT FOR TYPE B

Figure 2:
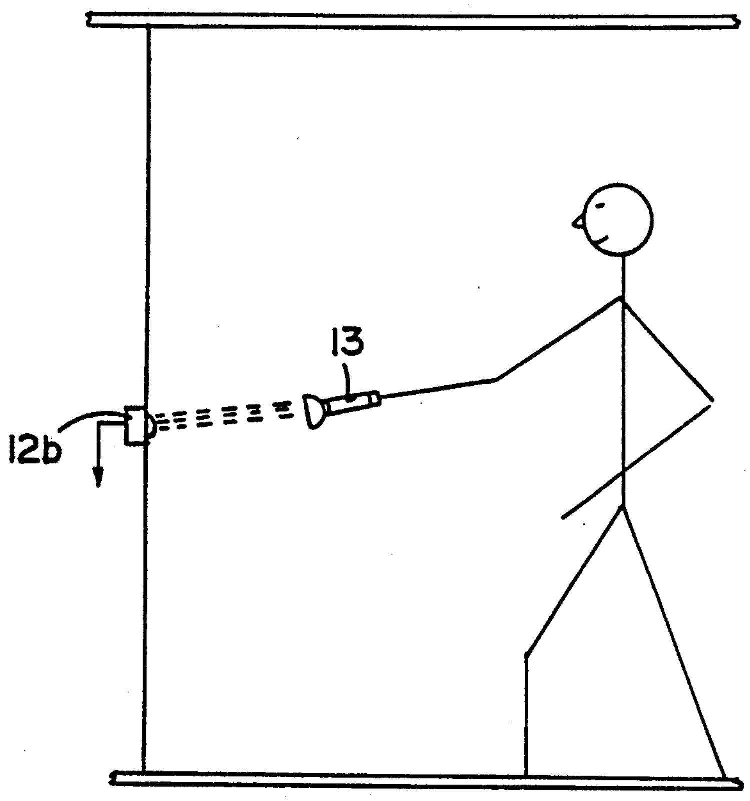
Figure 2A:
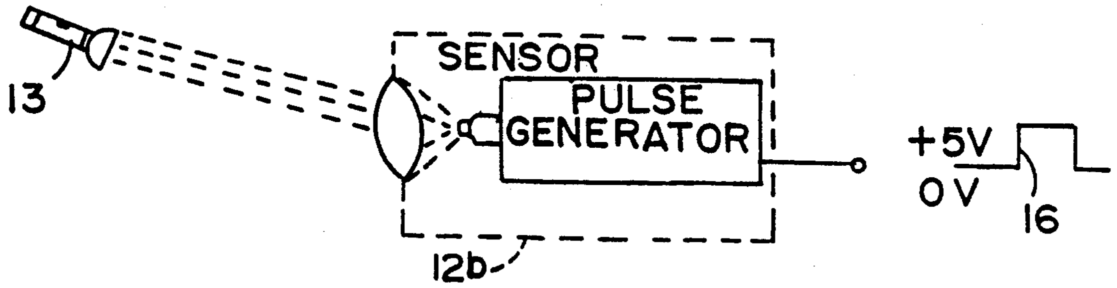

FIG. 2 shows that a movable light source (13) such as a torch, is used to direct light onto a light sensing element (L.S.E.) (12*b*) mounted on a specially constructed wall. FIG. 2*a* shows as before, the light beam being concentrated onto a sensor, but the pulse generator will now work in reverse. When light is falling onto the sensor, one 5 v 1 ms pulse (16) is being generated.

The electronics inside the pulse generator, for both TYPE A and TYPE B, will inhibit more than ten pulses per second being generated. This pulse can now be connected to further electronic circuitry which will interface it to M.I.D.I. compatable musical instruments.

Figure 3A:
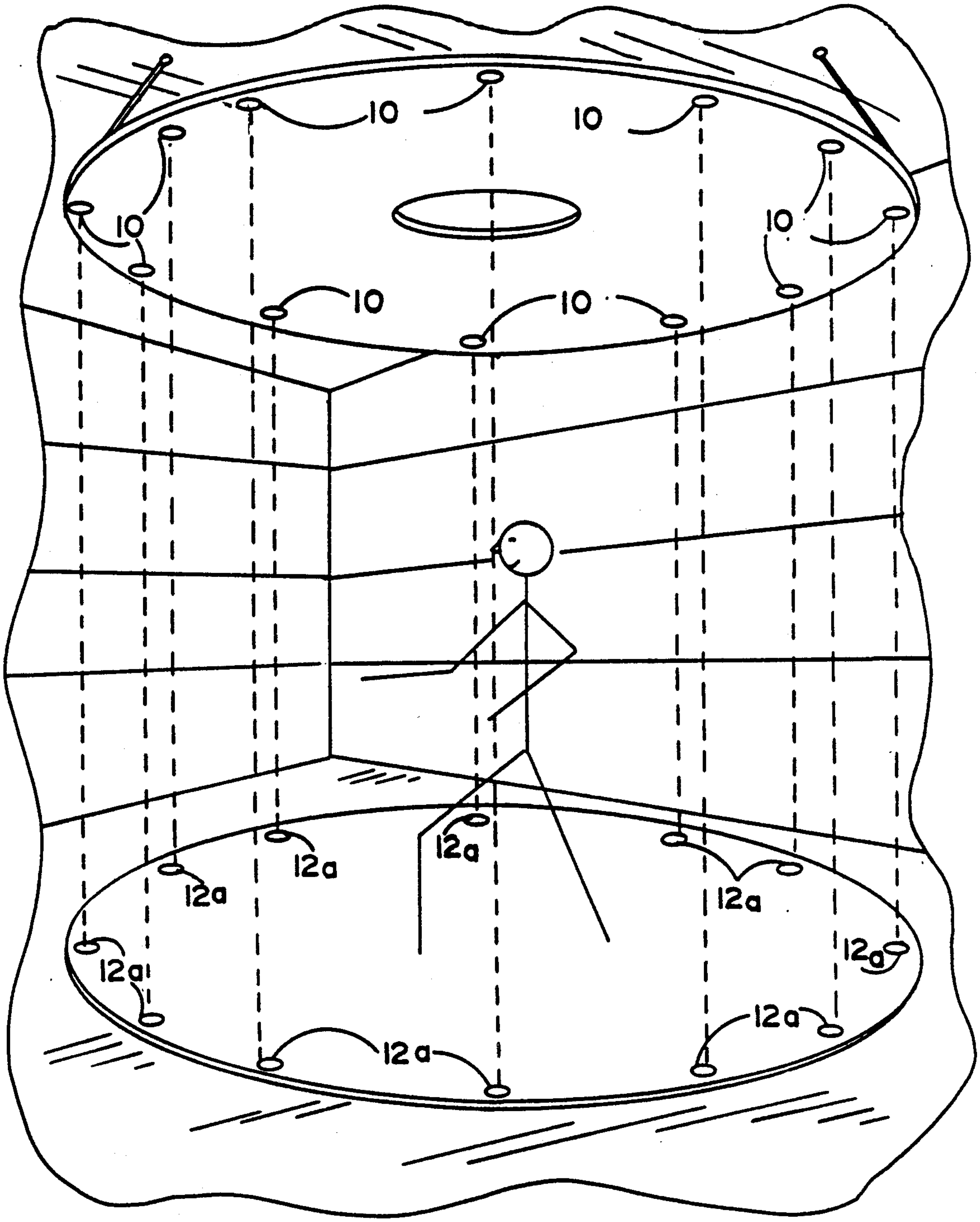

FIG. 3*a* illustrates twelve L.S.E.s for TYPE A (12*a*) arranged in a circle on a pre-fabricated floor. A similar circle of light sources (10) are fixed to a suspended ceiling. The operator can now activate any of these sensors with torso, arm, leg and hand movements.

Figure 3B:
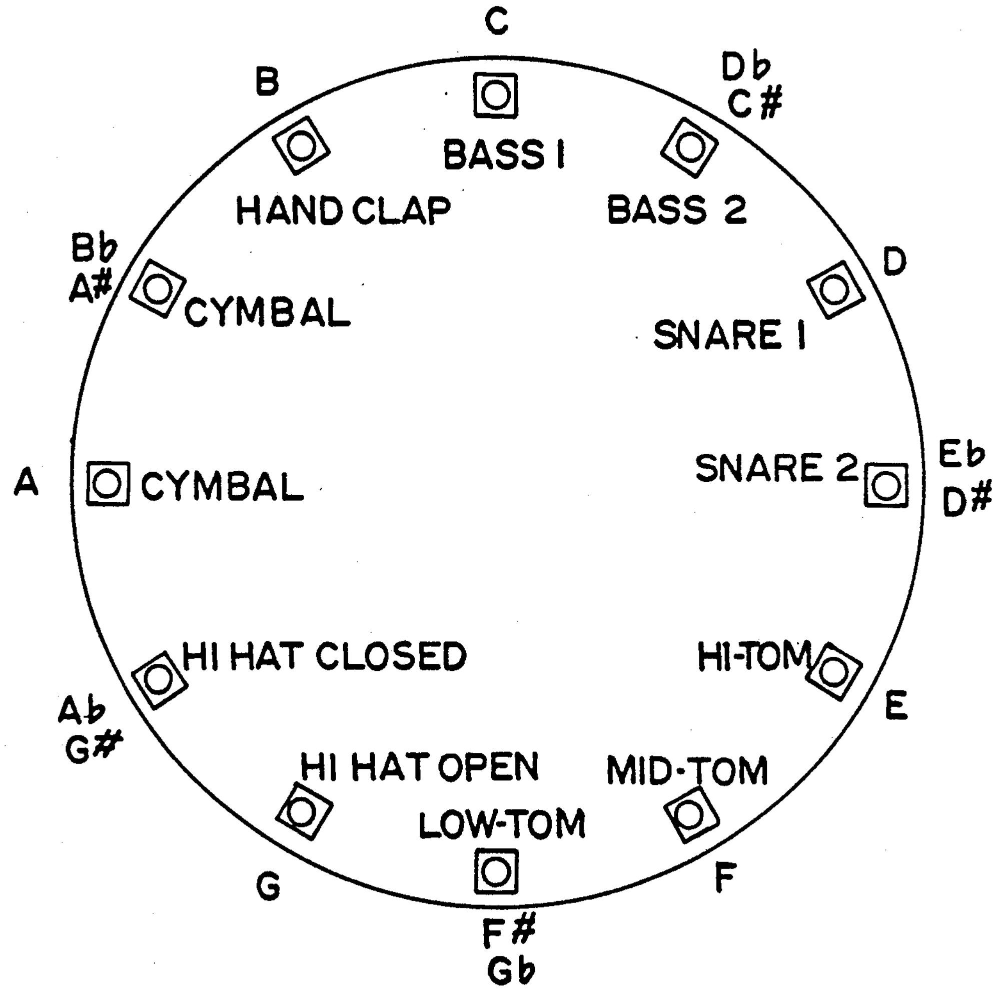

In FIG. 3*b* the twelve L.S.E.s (12*a*) may either be assigned to the twelve musical notes of the chromatic scale, thus enabling a tune to be played, or be assigned to electronically manufactured drum sounds so that a rythm pattern may be created.

Figure 3C:
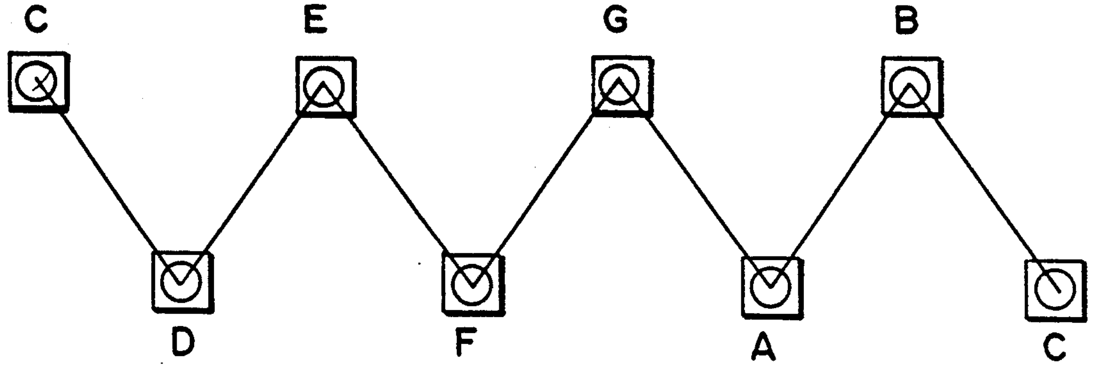

FIG. 3*c* suggests another arrangement of L.S.E.s of TYPE B (12*b*) to trigger synthesizer playing chords.

Figure 4A:
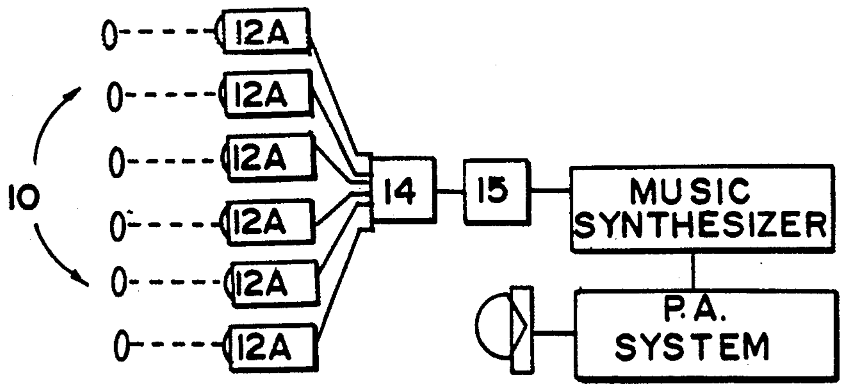

FIG. 4*a* shows the outputs of six L.S.E.s TYPE A (12*a*) connected to a signal processing unit (14) which converts the signals to drive a M.I.D.I. interface unit (15). The output of this M.I.D.I. interface is driving a music synthesizer connected to a Public Address system.

Figure 4B:
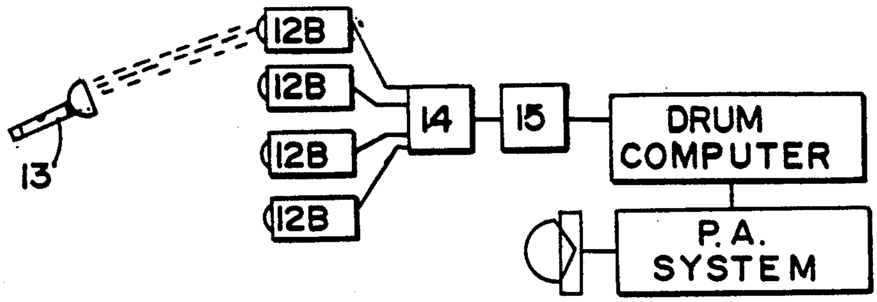

FIG. 4*b* is the same as FIG. 4*a*, but for TYPE B L.S.E.s (12*b*).

Figure 4C:
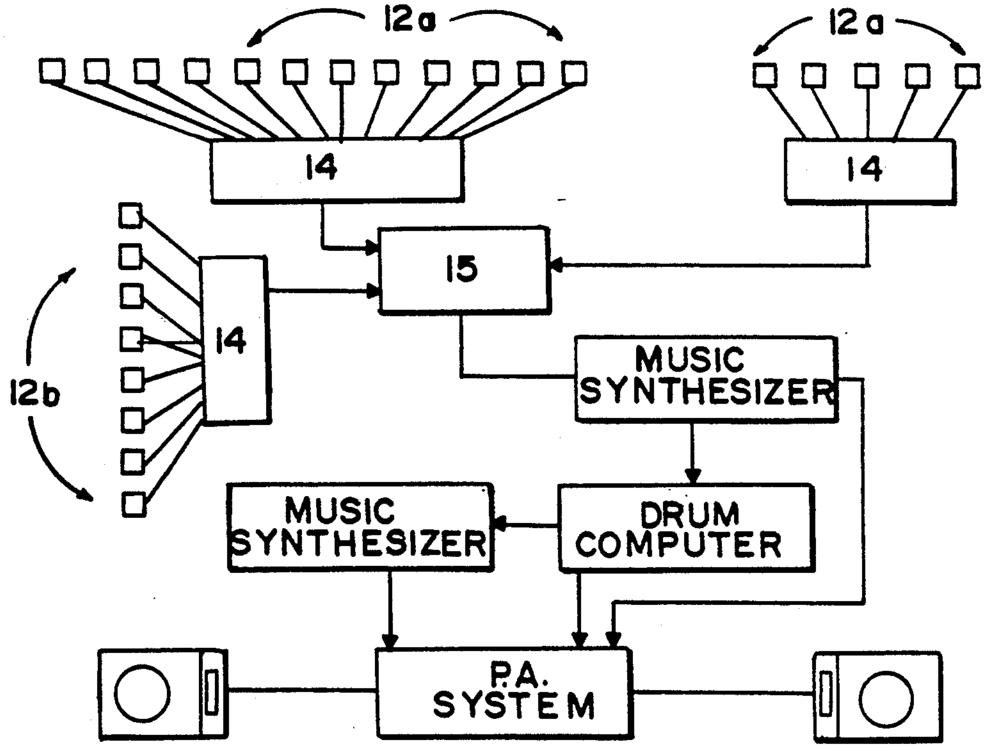

FIG. 4*c* is a suggested configuration of sets of L.S.E.s, TYPE A and TYPE B, connected via M.I.D.I. to various electronic instruments and on into a P.A. system.

In addition to the basic L.S.E.s described so far, two upgrades have been developed to incorporate dynamic modulation of M.I.D.I. instruments.

Figure 5A:
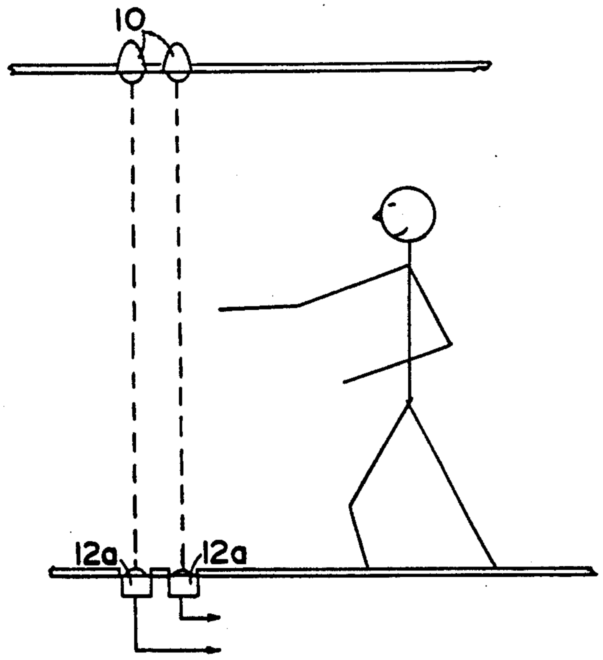

FIG. 5*a* shows the use of two parallel light beams striking two sensors. (It is likely that laser light will be employed in order to make this design practical to use.) By interrupting the light beams one after the other, the electronics shown in FIG. 5*b* can detect the time difference of the interruptions. Therefore, if a fast movement is used, a small time is detected. The electronics then converts the time inversely to an analog voltage level and a trigger pulse. This can now be interfaced to drive a M.I.D.I. channel with high voltage equalling high volume, and low voltage equalling low volume.

Figure 5B:
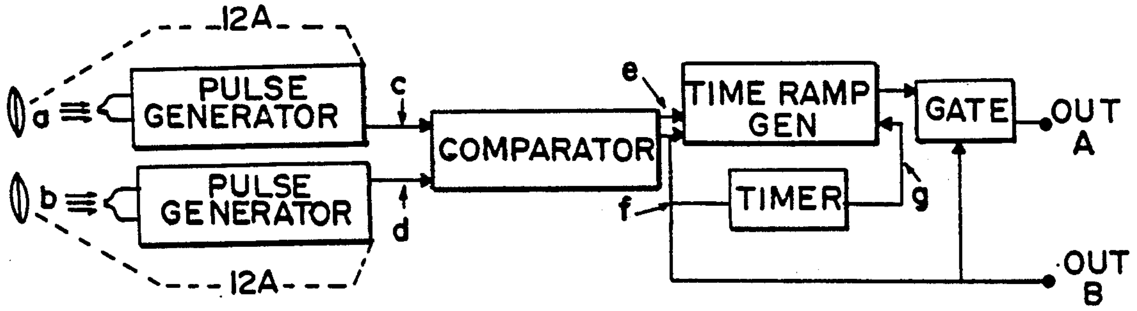

With reference to FIG. 5*b*, the comparator determines which pulse (c or d) occurs first, and outputs 'e' to the Time Ramp Generator. When the other pulse occurs, a pulse at 'f' will stop the Time Ramp Generator, gate the output to OUT A, and provide a trigger pulse at OUT B. The timer will reset the Time Ramp Generator after this process has taken place.

Figure 6A:
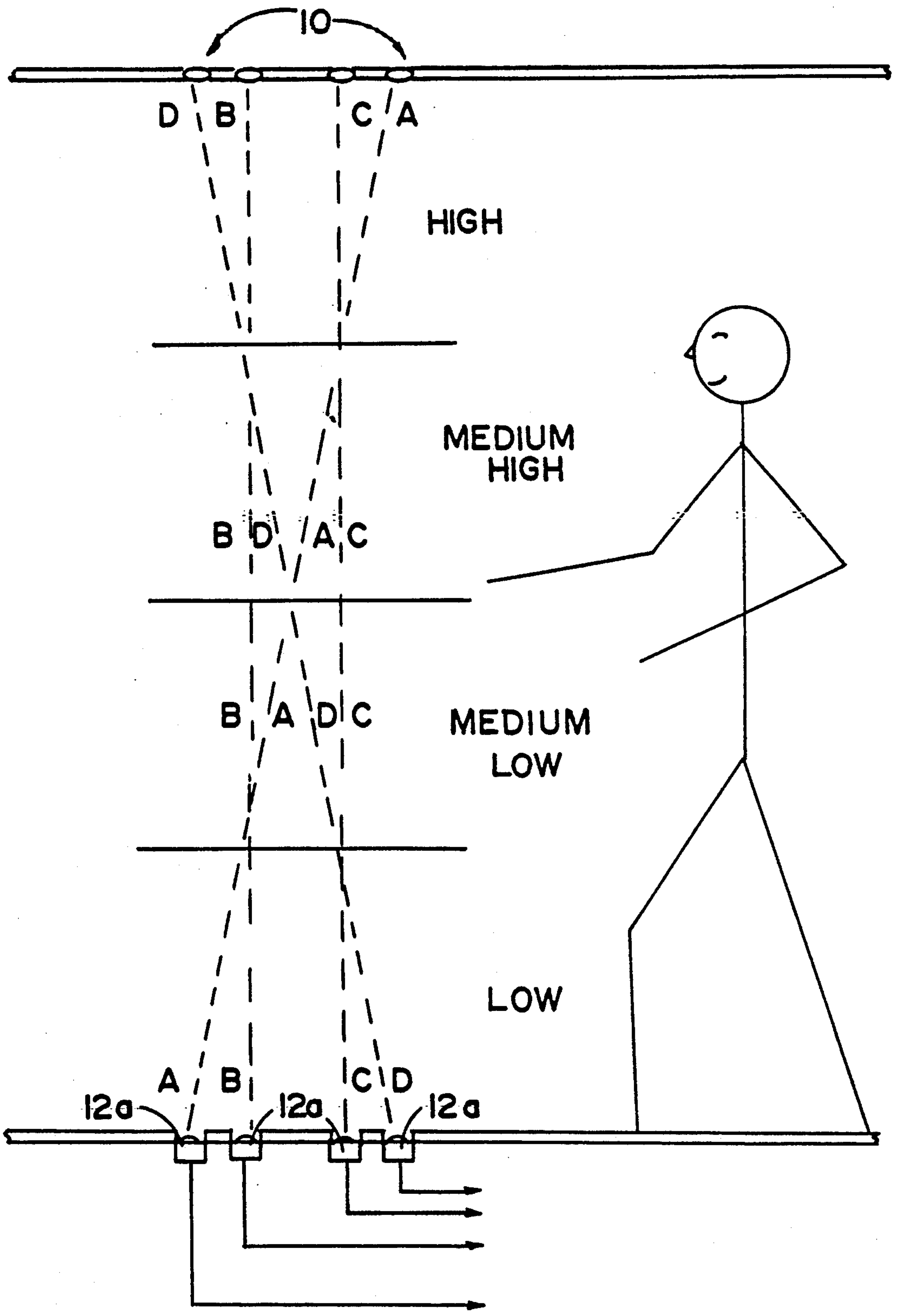

FIG. 6*a* shows how four laser light beams (A, B, C and D) may be trained on to four sensors. By interrupting the four beams of light in either direction at different heights above the floor, eight codes of triggering may be obtained:

| LOW | M. LOW | M. HIGH | HIGH |
|---|---|---|---|
| ABCD | BADC | BDAC | DBCA |
| DCBA | CDAB | CADB | ACBD |

Figure 6B:
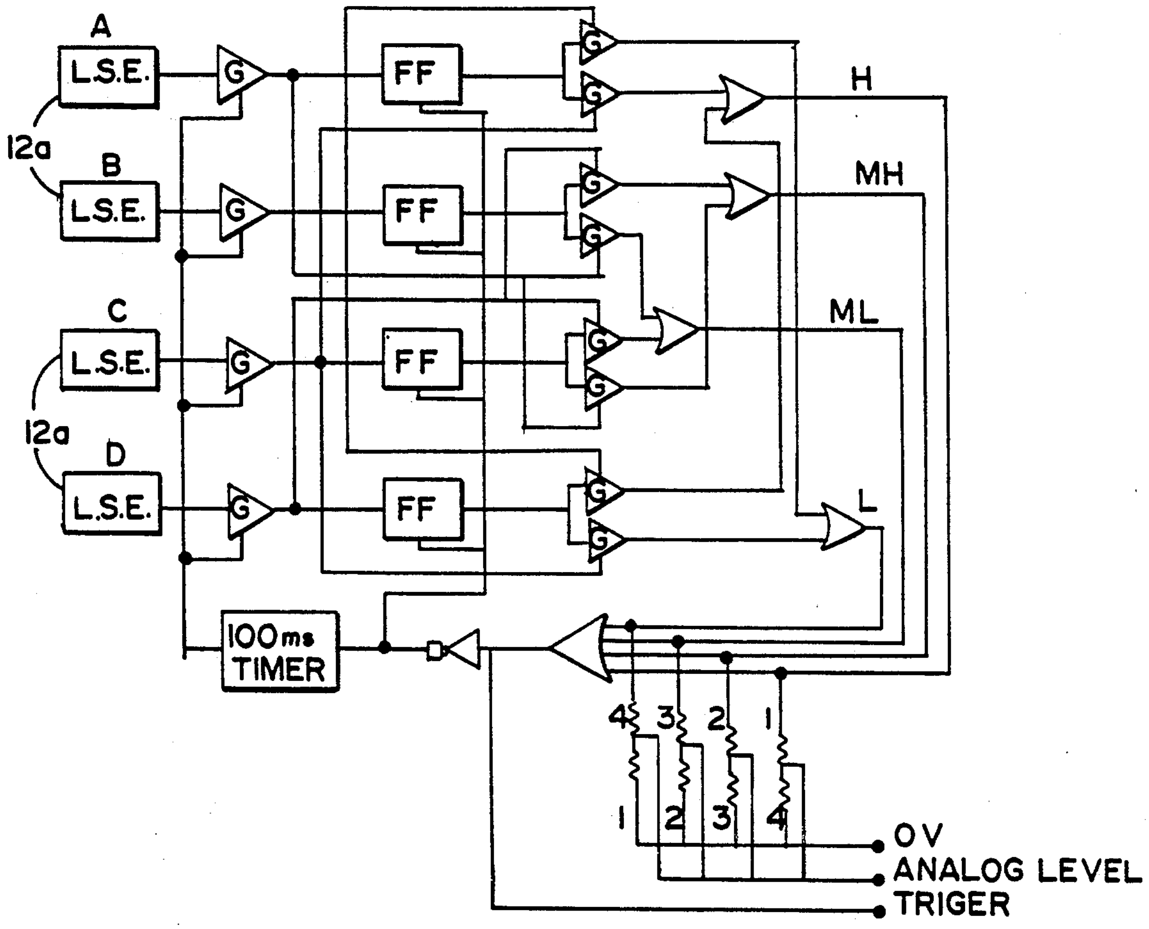

FIG. 6*b* shows the circuit diagram used for de-coding these eight sequences and creating four levels of volume, supplying one analog output and a trigger pulse as before.

Important Notice

All electronic components require 5 v D.C., and all levels are with respect to ground [0 v].

OPTIMUSIC, THE CONCEPT

The concept behind OPTIMUSIC is firstly, to change the way that popular music is performed, secondly to create "D.I.Y." in music at discos and nightclubs, etc, and thirdly to play music in space conditions, being weightless with no air, even if a somewhat futuristic view.

Over the past 30 years, electronic instruments have been used more and more in creation and performance of popular music. Because of the way these instruments have developed, we see the artistes playing the instruments, needing to be in physical contact with them. We know that Television and Video music is all mimed to pre-recorded songs, but we see the artisties miming with guitars, keyboards and drums which we know are not even plugged in.

Even live shows incorporate pre-recorded backing tracks, to achieve the studio sound that the public know. Also there is a need to have ample amounts of equipment and instruments on stage.

Our concept is to create music by dance and movement. The artistes are basically the dancers, who with choreography, play the instruments, by interrupting light beams, and also by directing light onto light sensors to activate electronic instruments via M.I.D.I. communication systems.

We firmly believe that this idea can revolutionise the presentation of popular music, as the art of dance will now be directly responsible for the music it requires. The involvement of dancers in popular music will increase dramatically as they become part of its creation.

OPTIMUSIC instruments can be used in discos and nightclubs allowing the attendants the chance to be part of "D.I.Y. Music". By installing OPTIMUSIC instruments on a dance floor, anyone can play drums, synthesizer, bass or percussion etc simply by interrupting the light beams.

Special songs can be written and recorded, to be remixed, reproduced and improvised upon by the participants of "D.I.Y. Disco".

In space conditions, and weightless environments, it is impossible to get dynamics on drums, keyboard etc, which is why there can be a great potential for OPTIMUSIC in a place, as yet, silent.

MY SECOND SPECIFICATION

Summary of my Prior Specification

Figure 1A:
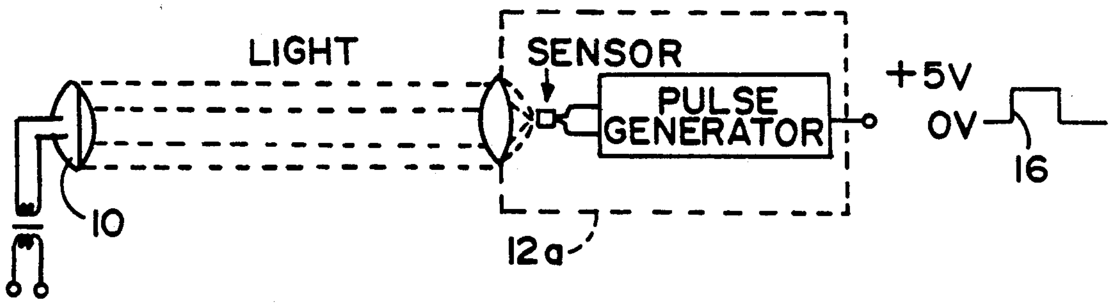

It will be seen from FIGS. 1 to 6B that means for producing and/or controlling music or the like comprise means 10,13 which produce light in a manner controlled by a dancer or the like, by interrupting the light in the case of FIGS. 1, 1A and by directing the light in the case of FIGS. 2, 2A, hence producing radiation signals indicative of the position and/or movement of the body (which term includes one or more parts thereof such as an arm) of the dancer or the like, and means 12A, 12B for sensing these radiation signals to produce therefrom control signals by means of the pulse generator shown in FIGS. 1A, 2A for producing and- /or controlling music or the like in the manner shown in FIGS. 4A, B, C.

In particular, the radiation signal producing means comprises radiation source means in the form of a torch 13 adapted to be carried by the said body in the case of FIG. 2 and the sensing means 12B are arranged to produce the control signals upon receipt of radiation (in the form of light) in the said radiation signals (hitting sensing means 12B).

In the case of FIG. 1A, the radiation signal producing means comprise radiation source means 10 arranged not to be carried by the said body and the sensing means 12A are arranged to produce the control signals upon interruption of the light radiation in the said radiation signals by an arm of the body.

In the example shown with reference to FIGS. 3A, 3B, the sensing means comprise a plurality of sensors 12A, each adapted to produce an individual said control signal for controlling an individual tone or rhythm member as shown particularly in FIG. 3B. The radiation signal producing means comprise a plurality of radiation sources 10, as shown in FIG. 3A, although it will be understood that the light for all the sensors 12A could come from a single source 10. Likewise, there could be a single sensor 12A co-operating with a plurality of light sources 10, e.g. the light sources flashing sequentially much faster than can be detected by the eye or the beams of light therefrom can be interrupted by the dancer or the like, the output from the common sensor 12A being synchronised to detect which beam or beams of light is or are being interrupted. In the particular example shown in FIG. 3A, each said sensor 12A is adapted to be responsive to the said radiation signals produced from a corresponding said radiation source 10. Furthermore, the sensing means comprise a plurality of sensors 12A arranged around, and in particular in a circle around, an area within which the dancer or the like can move.

Turning to FIG. 5A, 5B, there is shown a velocity sensing arrangement 10, 10, 12A, 12A and output circuits shown in FIG. 5B. This arrangement comprises means 10, 10 for producing two mutually close beams of the radiation, respective sensors 12A, 12A, and the circuitry shown in FIG. 5B connected to the latter to measure the time difference between closely successive co-actions of the respective beams with the said body of the dancer shown in FIG. 5A in order to produce a signal indicative of a velocity of the body co-acting with the beams, in fact a velocity component from side to side as seen in FIG. 5A.

Turning to FIG. 6A, 6B, there is shown a distance sensing arrangement. This comprises source means 10, 10, 10, 10, for producing two mutually close substantially parallel beams B, C of the radiation and close thereto two angled beams A, D of the radiation, respective sensors 12A, 12A, 12A, 12A, and circuitry as shown in FIG. 6B connected to the sensors to distinguish the order of closely successive co-actions of the four beams with the said body and hence provide an indication of the distance from the sensors of the body part, e.g. a hand, co-acting with the beams, the distance being given in terms of which of the regions "high", "medium high", "medium low", "low" the hand is located in. The co-action in this example is a successive series of interruptions from side to side as seen in FIG. 6A.

The sensing means 12A, 12B are adapted to produce the control signals in MIDI compatible code, e.g. the signals available on the "analog level" and "trigger" terminals of the circuitry shown in FIG. 6B. MIDI stands for Musical Instrument Digital Interface which is a standard code among manufacturers all around the world for connecting electronic musical instruments together and to microcomputers. It is digitally encoded information specifying the start or finish of a note, its "velocity" (loudness) and an assigned channel number, possibly together with other encoded information allowing a synthesiser or electronic musical instrument to select and characterise musical notes in accordance with a pre-arranged programme. The programme may use respective said control signals from sensors 12A to control note pitch (see FIG. 3B) or various electronic instrument sounds (see FIG. 3B), to control chords (see FIG. 4A) or to control rhythm pattern (see FIG. 4B). The total control means comprises also music generating means in the form of the music synthesiser shown in FIG. 4C connected to receive and be controlled by the control signals.

The word "OPTIMUSIC" was used in my prior specification to denote "optical music" but has in practice been reserved as a trade mark. It will be clear that the radiation to be used in the embodiments described in my prior specification is light.

DESCRIPTION OF INVENTION AND FURTHER EMBODIMENTS

Although the embodiments so far described can be made to work satisfactorily, they involve a lot of adjustment and accurate positioning to set ɹp properly and can be quite complicated. A neat solution to these difficulties can be obtained by using retroreflective material in producing the control signals. This is material which has the property of reflecting rays of light incident on the material each back substantially along its own incident path. Thus, a source can produce a beam of radiation and a retroreflector will reflect the light back to a sensor in or alongside the line of the beam, whether adjacent the source or or in front of it or behind it, otherwise, the position of the retroreflector being non-critical so long as it is within its range of orientation (usually a cone of semi-vertex angle 30°) and within the beam of light. Preferably, the source and sensor are mounted adjacent one another, preferably with the sensor in the form of a light-sensitive diode mounted in the centre of the cover glass of a narrow-beam lamp source. This arrangement has other advantages as will become apparent.

According to one aspect of the invention, as disclosed in my prior specification, there are provided means for producing and/or controlling music or the like comprising means to produce radiation signals indicative of position and/or movement of the body (which term includes one or more parts thereof) of a dancer or the like and means for sensing these signals to produce control signals for producing and/or controlling music or the like.

According to another aspect of the invention there is provided means comprising retroreflective means and a plurality of sets of means, each set comprising radiation source and sensing means to co-operate with the retroreflective means, adapted for selective operation of the sets due to positioning and/or movement of the body of a dancer or the like to produce control signals indicative of the positioning and/or movement. Each set may comprise its own retroreflective means.

Figure 10:
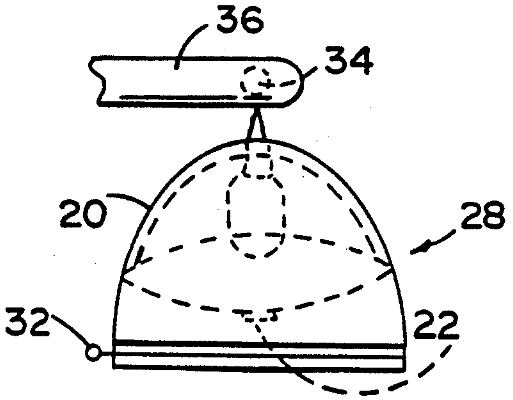
FIG. 10 is a side elevational view of a single light source, optical sensor and color filter supported by a universal ball joint.

Such an arrangement may be as shown in FIG. 3A modified as in FIG. 10. Each item 12A is now a piece of retroreflective material and each item 10 is a set of means, each set as shown in FIG. 10 comprising radiation source means 20 and sensing means 22 to co-operate with the retroreflector 12A, or considered differently as seen in FIG. 3A as modified by FIG. 10, each set comprising means 20, 22 of item 10 and retroreflector 12A, there being a plurality of such sets, the whole being adapted for selective operation of the sets due to positioning and/or movement of the body of a dancer or the like to produce control signals such as 16 FIG. 2A (produced upon presence of light) indicative of the positioning and/or movement.

However, this arrangement requires items to be set and adjusted above and below the dancer or the like and can be improved upon substantially. According to another aspect of the invention there is provided retroreflective means and radiation source and sensing means to co-operate therewith, one of these being adapted to be carried by the body of a dancer or the like to produce control signals responsive to positioning and/or movement of the body. A radiation source and sensing means may be carried as a unit by the dancer or the like, e.g. as the torch 13 shown in FIG. 2, and can be pointed selectively at any one or more of a plurality of retroreflectors arranged around the dance area. The signals from the latter can be distinguished by sequencing (as described above) or colour, for example, but a much neater arrangement is provided if the retroreflective means is carried by the body of the dancer or the like. Indeed this arrangement offers so many advantages that it represents a substantial advance on the other emboiments described above. For example, the retroreflective means can be quite simple and passive and the sensors can be selectively operated in response to the positioning and/or movement of the retroreflective material to provide the said control signals. A sensor may be responsive differently to different colours of retroreflective material, but an elegantly simple arrangement is obtained by using a plurality of sensors, each one responsive to the retroreflective material when it enters the beam of radiation from the source appertaining to that sensor.

Figure 7:
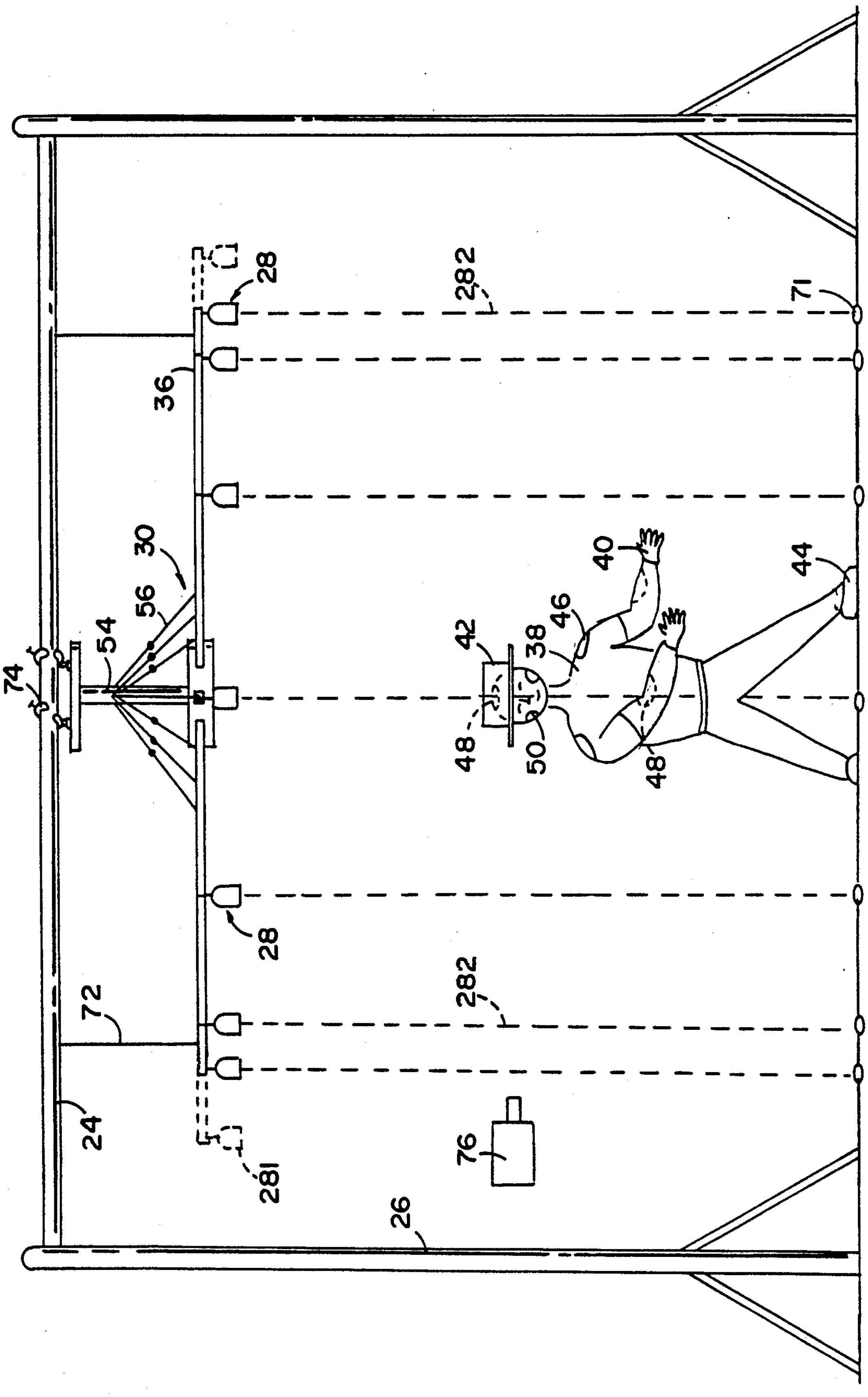
FIG. 7 is a side elevational view showing a person interacting with a pattern of light sources and sensors as illustrated in FIGS. 3*a* and 3*b*.
Figure 11:
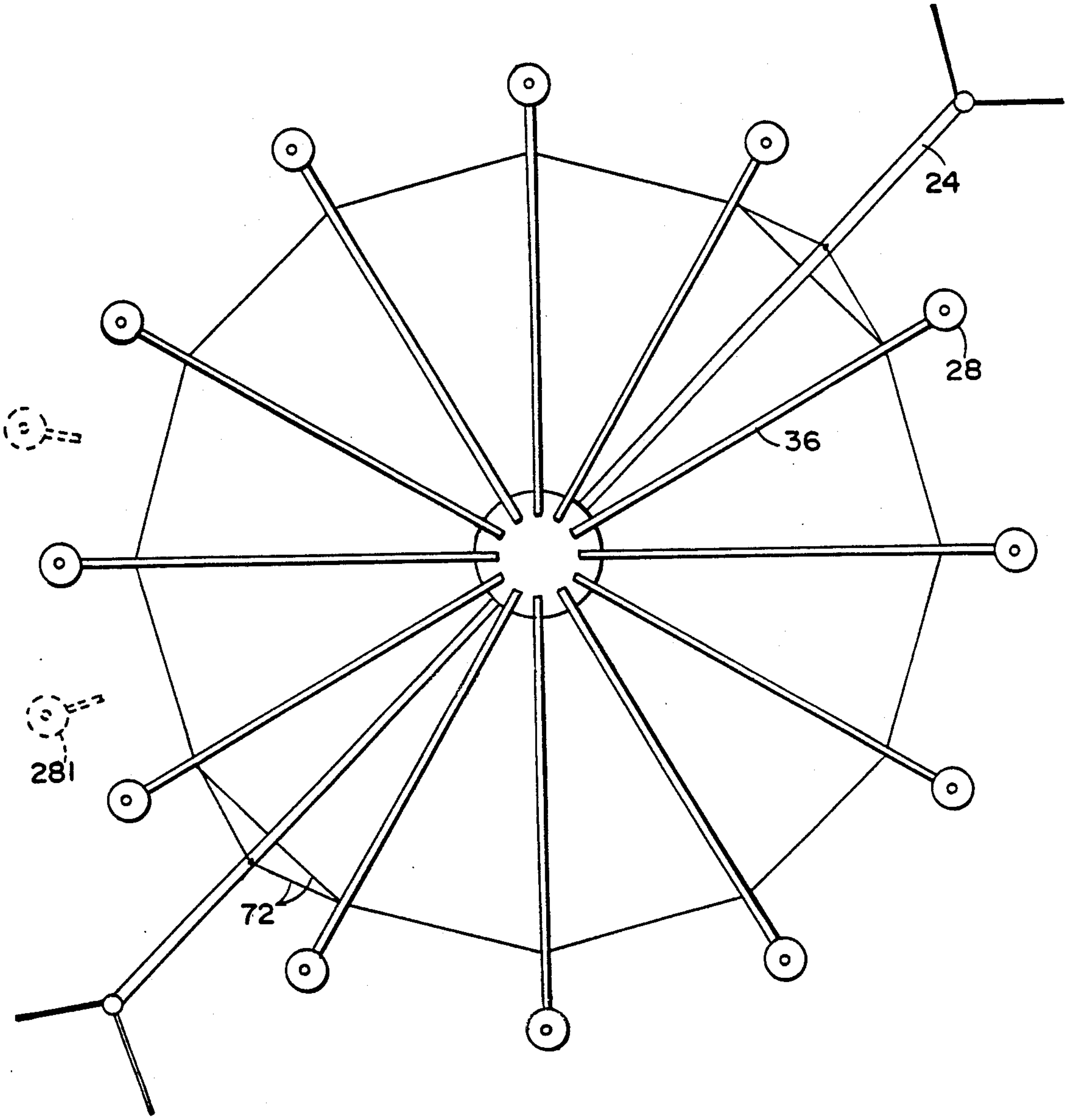
FIG. 11 is a view looking upward at the light supporting frame of FIG. 7.

This latter case is illustrated in FIG. 7 and 11. A bar 24 is placed on two stands 26 each located outside the dance area. Suspended from the centre of the bar 24 is an arrangement 30 of items 28, each as shown in FIG. 10 and comprising a radiation source in the form of a pinspot lamp 20, with a sensor 22 affixed to the centre of the cover glass of the lamp 20, the whole being fronted by a colour filter 32 and suspended by a universal ball joint 34 from an arm 36. The dancer 38 wears retroreflective material 40 adapted to be fastened to the body and/or to the clothing. This is preferably a garment made at least partly of retroreflective material such as gloves 40, hat 42 or shoes 44 but may be simply a piece of material such as epaulettes 46 to be fastened to existing clothing. Again, the retroreflective means may be in the form of retroreflective material adapted to coat the skin and/or hair, as material embodied in a powder 48 to go on the head hair or skin of the arm or as material embodied in a cream 50 to go on the face like make-up. The retroreflecting constituent will be microbeads or microcube corners. These may be combined with a suitable vehicle such as a cream base.

It will be realised that the use of a retroreflector carried by the dancer or the like, with its property of non-critical positioning, enables the arrangement to be particularly practical and rugged, as well as simple.

A further advantage is that the distance of the retroreflective means from the source and/or sensor 28 is found to control the intensity of the radiation sensed by the sensor and hence enables the said control signals to provide an indication of that distance. This provides an independent control parameter by which the dancer or the like can control some aspect of the music or the like. The intensity of the radiation sensed by the sensor 22 produces from the latter a corresponding amplitude signal which passes through an analog-digital converter to provide control signals indicative of the distance of retroreflective means 40 from item 28. These signals can be used to control volume so that, for instance, the dancer or the like can move e.g. a hand up and down in the beam from a particular source 20 to produce what is called "after-touch control", i.e. the ability to change the dynamics of a note after it has been started, e.g. variations in volume giving a vibrato effect. However, the same control can be used through the universality of MIDI coding to control pitch or any other aspects of the sound produced. The signal coming from sensor 222 can also be digitally differentiated to provide a control corresponding to the vertical velocity as seen in FIG. 7.

The radiation from sources 20 will normally be narrow beams directed vertically downwards so that they do not interfere with each other. However, there may be applications in which it is desirable to have beams which spread considerably and even overlap. Furthermore, there could be a second ring of items 281 (shown in broken lines) outside the ring of items 28, enabling special functions to be initiated or carried out by the dancer or the like, while not interfering with the normal co-action with the items 28.

The arrangement is intended to be used by a dancer-musician in a disco and therefore the radiation will normally be visible light, and is particularly attractive if the plurality of sources of the radiation are of respective colours, regardless of whether the colours have any other functional use. However, the radiation may be ultra-violet light or infra-red light, the latter having no visible effect, provided the dancer or the like knows her or his positions accurately enough not to need to see the radiation. While the different colours may be used for functional purposes, e.g. one colour for doh and another colour for the other notes of the sol-fah scale, or one colour for tones and another colour for semitones, they may be arranged with one colour to carry out one function such as memory of the ensuing notes until that colour is activated again, or may again be used to produce a coloured teaching device of the whole apparatus, e.g. for children and/or disabled people. For example, such a person may learn to associate particular coloured lights with respective musical sounds.

Colour filters 32 can of course be changed as to colour at will.

A further possibility is to have a plurality of the retroreflective means 40 adapted to reflect respective colours. For example, the colour filters 32 of corresponding colour would then allow the associated sensors 22 to be activated but none of the other sensors 22 would be activated. Thus, only a foot might co-act with sensors producing low octave notes such as drums while hands would act only with other sensors controlling high notes for melody.

A useful possibility with the MIDI system is for the sensing means to comprise a plurality of sensors at least one of which sensors is connected to modify the effect of the control signals from at least another of these sensors. For example, when the arrangement comprises means for producing electronic music responsive to the control signals from a plurality of said other sensors, said one sensor is adapted to change the programming of such production of electronic music. In more detail, it may introduce, modify or cancel a memory function and/or a complete programme function, or simply a synthesized instrument type.

It will be appreciated that the dancer or the like has a wide range of possibilities for control and can control different parameters simultaneously. For example, there is a plurality of sensors from which selections may be made, the duration of co-action with sensors may be controlled, the distance of the reflective means from a sensor can be varied, colours can be used as a further means of control. In addition, the synthesizer may incorporate or be connected to a computer which not only enables different programmes to be used so that the various parameters can control different things but enables the dancer or the like herself (or himself) to change such programme in the course of the performance or the like. Furthermore, memory can be used in any of the ways well-known in music synthesis. Additionally, one or more arms and/or legs can be used to provide co-action simultaneously with different sensors or to provide selective co-action with sensors (each such arm and/or leg having e.g. a different colour retroreflective means). Again, the whole arrangement may be replicated to enable a plurality of dancers or the like to form a band or orchestra. The output control signals may then be combined to feed together a synthesizer or a network of synthesizers. The outputs from the sensors may be multiplexed into an analog to digital converter using known technology, whether these be the different sensors from a single arrangement 30 or whether from a plurality of arrangements 30 for respective dancers or the like. An effect of particular use in discos is obtained by reserving one or more sensors for sound manipulation, e.g. controlling the effects known as chorus, echo, reverberation, delay, flanger, tremolo, fazing and so on.

As will now be explained with reference to FIGS. 8 and 9, the arrangement 30 comprises a plurality of units 28, each comprising a source 20 and sensor 22, and means 52 for adjusting the positions of the units in relation to a common axis 54. The means 52 comprise a telescopic arm mounting each unit 28. The arrangement 30 comprising these units 28 also comprises means 56 enabling the arrangement to be collapsible. The units 28 are each on an arm 52, the arms being in radial planes from the common centre axis 54 and hinged thereat by hinge 58, the means 56 comprising the hinges 58 and struts 60 hinged at 62, 64, 66. A common member 68 acting through strings 70 enables the whole arrangement 30 to be collapsed simultaneously, in the manner of the ribs of an umbrella, although naturally this is done after the telescopic arms have been retracted.

Figure 8:
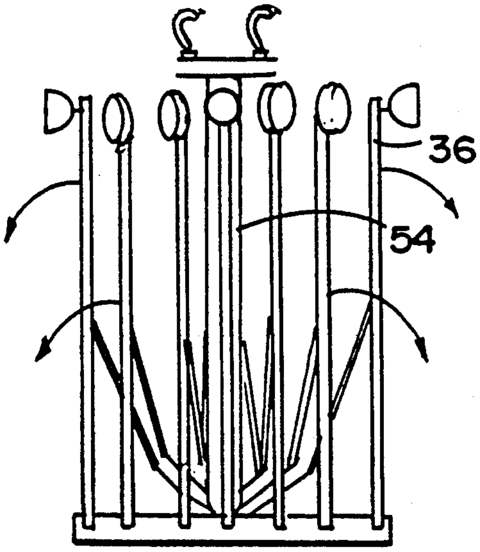
FIG. 8 shows the light source of FIG. 7 in a folded position.
Figure 9:
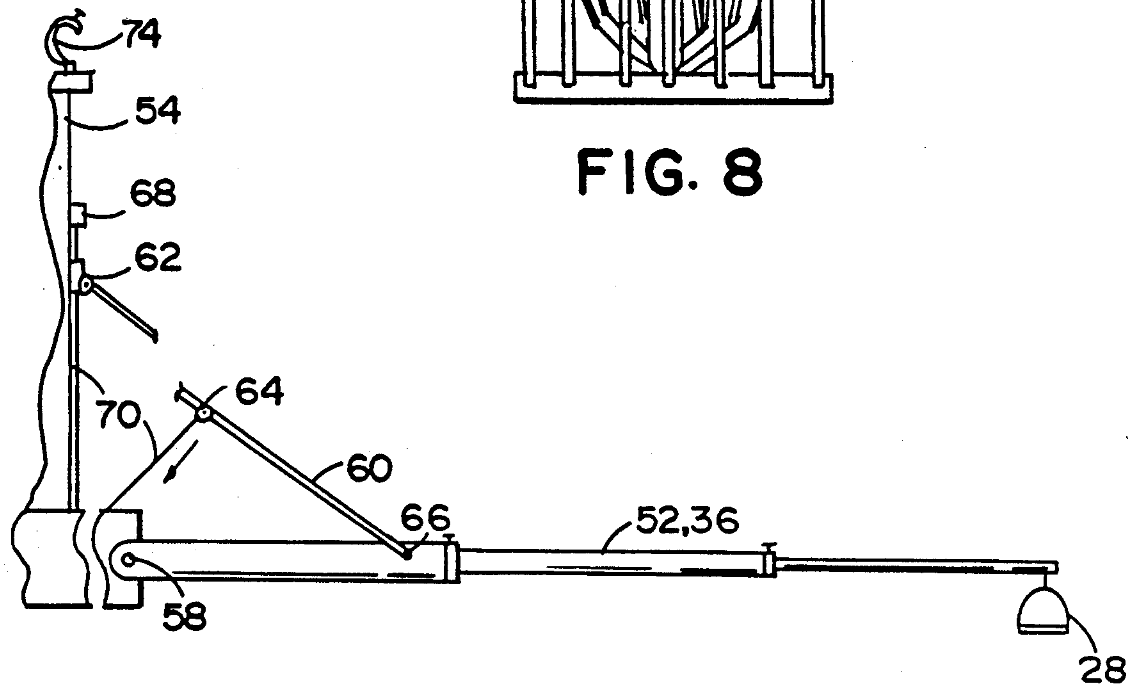
FIG. 9 shows one arm of the light source of FIG. 8 in an extended position.

FIG. 8 shows the collapsed arrangement 30. Arm 36 extends to 1.5 meter and in use is about 3 meters above the ground. Adjustable strings 72 maintain the spacing apart of arms 36 and their position relative to bar 24 to which arrangement 30 is clamped by clamps 74. Stands 26 can be dismantled so that the whole arrangement is easily transportable.

MY THIRD SPECIFICATION

The arrangements described in my prior and second specifications can have applications to schools, dance schools, pop groups, discos, holiday camps, children's groups party activities, theatres, performing places, home entertainment, therapy and exercise. For example, the arrangements can open new doors in the art of dance, as dancers will now have a tool which can enormously enhance their creativity. In education and recreation, the arrangements can combine dance, movement and music in the curriculum at schools, dance studios, holiday camps and various other venues for children's games and activities (and also for adults). In social contexts, by installing such equipment in nightclubs and discotheques etc, visitors can participate in the activities by themselves providing music by means of dancing, e.g. in conjuction with whatever group is playing the basic music. In entertainment, the arrangements can be used to enhance the visual effects and aspects of the presentation of shows, popular music, cabaret etc. In rehabilitation, the apparatus could be of great assistance in therapy for the disabled and handicapped, ultimately improving motion, co-ordination and perception.

Figure 12:
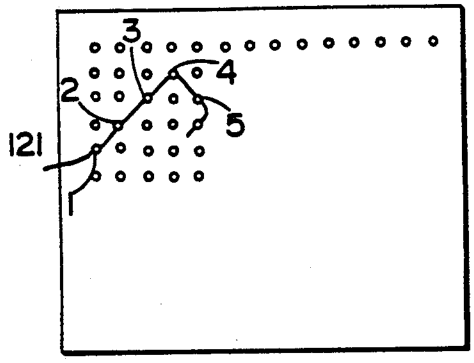
FIG. 12 is a schematic view of a training device to teach the use of optical control.

In one example FIG. 12, for training and exercise, a first beam of light 1, when interrupted, causes a note to play and a second beam of light 2 to be switched on. This, when interrupted, does likewise and so on 3, 4, 5. This trains the dancer or the like as to movements, and can be used simply as a trainer, or as a training programme mode of any of the previously described arrangements, (in which case, when the training is finished, this mode is suppressed and the beams are maintained throughout the activity of the dancer or the like).

In a second example, the apparatus can be set up to train a dancer for ordinary dancing. If the movements (and possibly timing) are correct, the beams, suitably placed, will cause a melody to be played correctly and this will enable the dancer or teacher to determine whether the dance is being performed correctly.

The dancer may be replaced by a musician, a patient for therapy, an entertainer, even an animal. One can readily imagine a horse trained to perform particular movements which will co-act with the beams of radiation in any of the above described arrangements to produce music. Again, the apparatus can be incorporated in a clown act in a circus to produce interesting sound effects when the clowns occupy particular places.

An important feature is that the operator should, be able to affect the sensors selectively and, preferably using perceptible said beams of radiation as a reference system. Thus, such beams can be visible, or audible, but could be heat, or even ultra-violet light provided the operator carries a flourescing pigment. Again, there may be two sets of beams of radiation, one set being perceptible and the other set being imperceptible but in known positional relationship to the first, e.g. each second beam being just to the north of a corresponding first beam, so that the operator perceives a first beam and then positions the body to intercept the corresponding second beam to effect a desired sound response.

In one practical embodiment, the artistic effect was considerably enhanced by interspersing the actuable beams with other coloured light beams which were inoperable.

Figure 13:
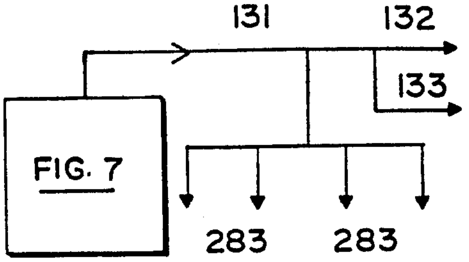
FIG. 13 shows the output signals from the array of FIG. 7 coupled to control sound, light and movement.

In an arrangement of particular interest, FIG. 13, a number of the beams, e.g. of light 282 can be interrupted by a performer 38 to produce selectively, in one of the manners indicated above, signals 131 to operate lights 283, e.g. on a stage or in a disco. These lights are operated in place of or in conjuction with the musical sounds 132 indicated above. The operator's body may be provided with retroreflective material 46, 48 for this purpose. If the latter is on only one side of e.g. a hand, the beams can be double-ended, i.e. a light source and sensor can be located at both ends of a radiation path 282 (so that two coincident beams will be radiated in opposite directions along the same path) and that the sensor will be activated towards which the retroreflector faces. A combination of beams 282, e.g. operated by two hands or two performers simultaneously, or e.g. a vertical and horizontal one at a particular crossing point, may produce a further or particular control signal for sounds and/or lights. These features of double-ended beams and simultaneous activation may, of course, be applied to the arrangements described earlier herein, just as can the use of the equipment for operating lights, or indeed 133 movement of objects on a stage, of scenery, of objects external to a stage, of a stage itself, of loudspeakers, of lights etc, or again for controlling colour intensity, flashing, rotation and other movements, variations or changes of lights, and again for controlling release of stage smoke, odours, temperature control and even releasing stage snow, stage rain or balloons, or any combination of these.

By adjusting the sensitivity of the sensors to require use of retroreflective material, the apparatus can be made to respond only to those parts 44, 46, 48, 50 of e.g. a dancer's body wearing or coated with such material, who can thus choose when position and/or movement in a particular region will or will not produce a signal, giving an extra degree of control.

Figure 14:
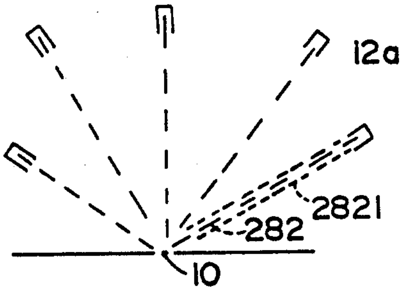
FIG. 14 shows how a single light source can be optically coupled to a plurality of sensors.
Figure 15:
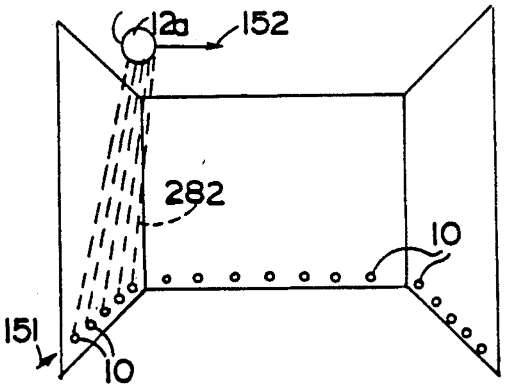
FIG. 15 shows how a single sensor can receive optical signals from a plurality of light sources.

It is possible to have a single light source 10, FIG. 14, producing a number of beams 282, each aligned with an individual sensor 12A. Conversely, there can be a single sensor 12A, FIG. 15, adapted to respond in distinguishable manner to a plurality of radiation sources 10, e.g. by having each light source modulated 151 at a different frequency and detecting 152 the respective frequencies in a common sensor output. Again, any other known form of distinction could be used, e.g. by phasing the light sources successively and then sampling a unified sensor output at corresponding times. However, the cheapest, most fool-proof and most stable apparatus appears to be one in which there is a separate light source and sensor for each output signal required. Each radiation beam is a straight line but could be reflected a number of times, e.g. in neighbouring paths across a plane, as in FIG. 3*c*, so that interruption or reflection at any one path in the plane will operate the corresponding sensor.

Figure 16:
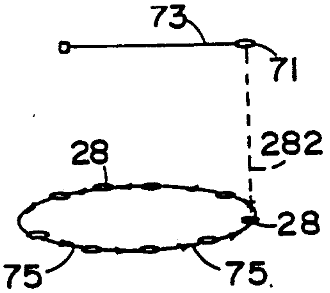
FIG. 16 shows how a single sensor can be moved to couple with a plurality of spaced light sources.

Again, a neighbouring pair 28 FIG. 7 of radiation source 10 and sensor 12A may co-operate with an opposite fixed retroreflector 71 to detect when the beam provided by the radiation source is broken by a dancer etc 38. The retroflector 71 may be stationary, e.g. in the middle of the floor or ceiling, or elsewhere, or mobile e.g. on the extremity of a rotary arm 73, FIG. 16, to serve each in turn of sets 28 of radiation source 10 and sensor 12A, possibly rotating so rapidly so that it is effectively serving all of the sets continuously, with time division multi-plexing 74 of the signals from the respective sets to enable them to travel along a single information channel 75. Again, there may be a single source of light, e.g. a laser beam, serving many sensors, simultaneously e.g. by static reflector, semi-silvered, or sequentially, by rotary reflectors.

Figure 17:
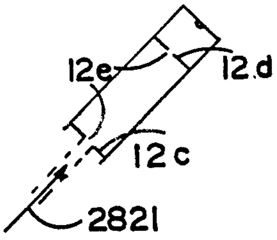
FIG. 17 shows the use of pinhole diaphragms in an elongated tube to narrow the area viewed by a sensor.

One form of sensor device (that may be used to obviate the need for retroreflector means while still allowing of a stable equipment) comprises a sensor at one end of a long narrow tube 12A, FIG. 14, or its equivalent. This can avoid detection of spurious reflected light and restrict the region of activation by a dancer etc to a narrow, almost cylindrical region of space 2821 extending co-axially from the tube which may have FIG. 17 (or be replaced by) one or more spaced apart diaphragms 12C, D each with a pinhole 12E or other narrow aperture to give narrow definition of the region. This would be used with a dark background and the sensitivity of the sensor would be adjusted to sense light relected from skin (or a light material).

Figure 18:
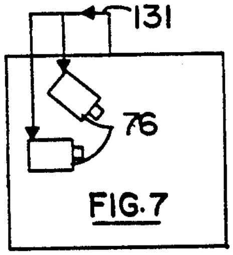
FIG. 18 shows the use of the optical control signals generated by the array of FIG. 7 to control the movement or positioning of TV cameras.

An important function of the beams of suitable radiation can be to act as a reference system 282, 282 FIG. 7, and give a position indication to the dancer etc. This reference system can also be used by TV cameras 76. Again, the control signals 131, FIG. 18 proceeding from the equipment 28 can be used to control any of the usual functions and movements of TV cameras 76, so that, for example, a dancer can be her own producer and by her co-action with the beams can operate the cameras herself. The relevant camera functions may be translations, rotations, zooming, focusing, switching from one camera to another or "on" and "off", or image quality, e.g. image reversal or image quantisation by computer graphics.

Figure 19:
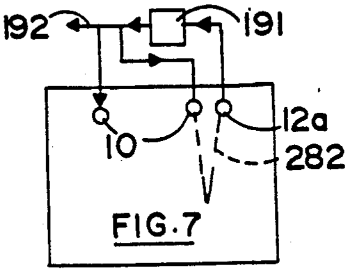
FIG. 19 shows how the control signals generated from the array of FIG. 7 can be used directly or with the aid of a computer to control additional light sources.

The control signals 131, FIG. 19 from the sensors 12A can be connected (or programmed through a computer 191) to operate their own radiation sources 10 or others of the radiation sources, or any other equipment 192, in any sequence, with or without programming based on what has happened before or what may happen in the future. For example, if the output signal from one of the sensors 12A is connected not only to provide an external signal 192 but also to control the related light source 10 positively, it is possible to obtain an astable, a monostable or a bistable arrangement. For example, the beams of light may be of low intensity but, when one of them is interrupted by a reflector, the corresponding sensor output signal operates to increase the light intensity, which in turn increases the reflected light, which in turn increases the output signal and so on until a maximum brightness is obtained. Thus, when there is interaction (e.g. reflection) with one of the beams 282, FIG. 19 that beam switches from low to high intensity, substantially instantaneously or with any built-in rise time or shape of rise curve. When the interaction ceass (or is reduced below a threshold level), the beam may (by using a suitable processing circuit e.g. 191) change colour or revert to its low level of illumination or remain at its high level of illumination. In the latter case, for example, a stage spotted all over with the beams FIG. 12 (each having its sensor) all on low illumination can be made to retain an image of the path 121 traced out by a dancer moving through the beams, 1, 2, 3, 4, 5, FIG. 12 the path being illuminated by high intensity beams. These may switch off after a predetermined delay or upon actuation of a particular further one of the beams or upon the first time that the dancer moves backwards or upon the first time (or second or other number) that the path crosses itself, i.e. when any one of the sensors is actuated for a second (or other number) time.

There can be multiple control. For example, each sensor 12A FIG. 19, can detect (a) on/off (b) position in a beam (c) speed along a beam and/or (d) duration in crossing a beam, some examples of which have been given above. Any of these parameters can be made to control 191 any parameters of the controlled quantity 192, whether this is a sound (e.g. timbre, pitch, loudness), light, movement, release or otherwise. These control functions can be operated very conveniently by MIDI interface. Further, MIDI can be used to produce selected sounds 192 which are not musical but may be vocal, e.g. word elements to compose words, or complete words or phrases. This leads on to adaptions of the apparatus to communication, e.g. for dumb people, or again for communication in a situation in which the communicator has to be silent although the communicatee has to receive the communication in sound. Thus, the operator can control voice synthesis for therapeutic, communication or even artistic purposes, and can effect further manipulation, e.g. frequency transformation, e.g. by sampling techniques which are well known using MIDI.

Figure 20:
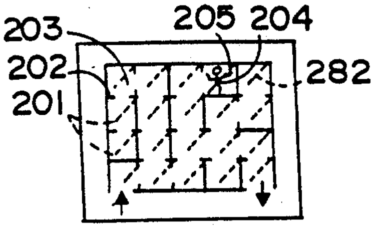
FIG. 20 shows the use of the light sources and sensors in a maze type game.

Another possible use of the equipment is a maze game FIG. 20, in which areas 201 of e.g. a stage or large room are fenced off 202 from each other but with openings 203 between them to constitute a maze. If the subject 204 trying to solve the maze finds it too difficult, they can expose a piece of retroreflective material 205 which will then react with at least one of the beams 282 in each of the areas to give instructions or to provide a "reward" tune, or lights or the like to indicate the correct path. For children, this could be in the form of a magic wand or sword which is exposed when the child is in difficulty and then produces an audible or visual "key" to guide the child out of the maze. Thus, the invention extends also to:

1. A life-size maze divided into sections, each provided with radiation source and sensing means having a threshold response level so as to produce indicative signals responsive to the presence of retroreflective material in the section and to respond differently or not al all in the absence of such material;
2. Light control means comprising means to produce radiation signals indicative of position and/or movement of the body (which term includes one or more parts thereof) of a controller and means for sensing these signals to produce control signals for producing and/or controlling lighting;
3. A method of training comprising use of the above apparatus;
4. A method of performing dance or movement, comprising use of the above means;
5. A method of producing a recording comprising use of the above means or method;
6. A recording produced by any such method which recording is visual, audio or both.

What is claimed is:

1. An optical control means comprising: means for producing a plurality of light beams; a plurality of directional sensing means arranged to sense cutting of the respective beams by a user and an output signal from said plurality of directional sensing means, the beam producing means being carried on a support means comprising a plurality of arms, the arms being hinged to enable the support means to be collapsed.

2. An optical control means as claimed in claim 1 in which the arms are telescopic.

3. An optical control means as claimed in claim 1 in which the arms extend generally radially outwards in a plane and are hinged at their inner ends.

4. An optical control means as claimed in claim 3 in which the arms are arranged to collapse in the manner of an umbrella.

5. An optical control means as claimed in claim 1 in which the beam producing means are arranged to produce a plurality of generally vertical beams, of such spacing and location as to enable a user to stand amongst them.

6. An optical control means as claimed in claim 5 in which the beam producing means are arranged in a circle.

7. An optical control means as claimed in claim 5 in which at least one sensing means is arranged to detect a light beam, an output signal being produced when the user interrupts said light beam.

8. An optical control means as claimed in claim 5 in which at least one sensing means is arranged to detect the output signal being produced when the user cuts one of said vertical beams and thereby reflects it back to the said one sensing means.

9. An optical control means as claimed in claim 8 in which said sensing means are located on the arms adjacent said beam-producing means.

10. An optical control means as claimed in claim 8 in which at least some of the sensing means are arranged to produce an output signal only when the respective beam is reflected back by retroreflective material on a user.

11. An optical control means as claimed in claim 7 in which said sensing means have respective collimating means.

12. An optical control means as claimed in claim 5 in which said beam producing means comprises a plurality of individual light sources.

13. An optical control means as claimed in claim 5 in which said beams are generated by a single light-source.

14. An optical control means as claimed in claim 1 including a plurality of filters for the beams, to produce beams not all of the same colour.

15. An optical control means as claimed in claim 14 in which the colours are so arranged that by cutting beams of a first colour a user can produce output signals of a first class and by cutting beams of a second colour he can produce output signals of a second class.

16. An optical control means as claimed in claim 1 in which said support means is positioned above a user.

17. An optical control means as claimed in claim 1 including velocity sensing means comprising timing means arranged to measure the time difference between the cutting of adjacent beams, and means for producing an output signal representative thereof.

18. An optical control means as claimed in claim 1 including distance sensing means for sensing how far from its respective sensing means a beam was cut.

19. An optical control means as claimed in claim 18 in which the distance sensing means comprises source means for producing two substantially parallel beams and adjacent thereto two angled beams, respective sensing means, and circuitry arranged to distinguish the order of successive cuttings of the four beams and hence provide an indication of the distance from the sensing means of the cutting.

20. An optical control means as claimed in claim 1 wherein an output signal is produced by one of said plurality of sensing means, said output signal modifying the output signal from at least another of said sensing means.

21. An optical control means as claimed in claim 1 in which said sensing means are arranged to produce output signals in MIDI compatible code.

22. An optical control means as claimed in claim 1 wherein a sound producing means is controlled by said output signal from said plurality of sensing means.

23. An optical control means as claimed in claim 22 in which the sound producing means comprises an electronic musical instrument.

24. An optical control means as claimed in claim 23 including at least one sensing means adapted to produce an output signal for changing the programming of the musical instrument.

25. An optical control means as claimed in claim 1 in which the output signals are arranged to control stage lighting means.

* * * * *

UNITED STATES PATENT AND TRADEMARK OFFICE
CERTIFICATE OF CORRECTION

PATENT NO. : 5,017,770

DATED : May 21, 1991

INVENTOR(S) : Hagai Sigalov

It is certified that error appears in the above-identified patent and that said Letters Patent is hereby corrected as shown below:

Column 4, Line 21:
"artisties" should be --artistes--.

Column 6, Line 40:
Delete "or" second occurrence.

Column 7, Line 33:
"emboiments" should be --embodiments--.

Column 10, Line 55:
"flourescing" should be --fluorescing--.

Column 11, Line 59:
"retroflector" should be --retroreflector--.

Column 12, Line 53:
"ceass" should be --ceases--.

Column 13, Line 42:
"al all" should be --at all--.

Signed and Sealed this

Seventeenth Day of November, 1992

*Attest:*

DOUGLAS B. COMER

*Attesting Officer* *Acting Commissioner of Patents and Trademarks*

UNITED STATES PATENT AND TRADEMARK OFFICE
CERTIFICATE OF CORRECTION

PATENT NO. : 5,017,770

DATED : May 21, 1991

INVENTOR(S) : Hagai Sigalov

It is certified that error appears in the above-identified patent and that said Letters Patent is hereby corrected as shown below:

On the Title page

Item [62] should read -- Division of Ser. No. 081,007, June 1, 1987.

Item [30] should be inserted to read:

Foreign Application Priority Data

U.K. 8524708 10-7-85

U.K. 8608067 4-2-86

Signed and Sealed this

Twenty-sixth Day of January, 1993

*Attest:*

DOUGLAS B. COMER

*Attesting Officer* *Acting Commissioner of Patents and Trademarks*